(12) United States Patent
Kothuvatiparambil et al.

(10) Patent No.: US 9,734,254 B2
(45) Date of Patent: Aug. 15, 2017

(54) METHOD AND APPARATUS FOR AUTOMATIC COMPLETION OF AN ENTRY INTO AN INPUT FIELD

(71) Applicant: Bank of America Corporation, Charlotte, NC (US)

(72) Inventors: Viju Kothuvatiparambil, Seattle, WA (US); Stephen L. Yeager, Seattle, WA (US); Marco A. Ramirez, Burien, WA (US); Ramakrishna R. Yannam, Seattle, WA (US); David H. Witting, Puyallup, WA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 14/595,296

(22) Filed: Jan. 13, 2015

(65) Prior Publication Data

US 2016/0205070 A1 Jul. 14, 2016

(51) Int. Cl.
  *G06F 17/30* (2006.01)
(52) U.S. Cl.
  CPC .... *G06F 17/30876* (2013.01); *G06F 17/3064* (2013.01); *G06F 17/3097* (2013.01)
(58) Field of Classification Search
  CPC ... H04L 63/0209; H04L 67/02; H04L 67/146; H04L 67/306; G06F 17/30876; G06F 17/30864; G06F 17/3064; G06F 17/3097; G06Q 10/10
  USPC .......................................................... 726/28
  See application file for complete search history.

(56) References Cited

U.S. PATENT DOCUMENTS

| | | | |
|---|---|---|---|
| 5,956,659 A | 9/1999 | Spies et al. | |
| 6,564,213 B1 | 5/2003 | Ortega et al. | |
| 7,027,974 B1 | 4/2006 | Busch et al. | |
| 7,437,295 B2 | 10/2008 | Pitts, III et al. | |
| 7,739,104 B2 | 6/2010 | Berkan et al. | |
| 7,937,402 B2 | 5/2011 | Feng et al. | |
| 8,140,556 B2 | 3/2012 | Rao et al. | |
| 8,645,825 B1 | 2/2014 | Cornea et al. | |
| 2002/0133715 A1* | 9/2002 | Benini ..................... | G06F 21/31 726/4 |
| 2005/0114367 A1 | 5/2005 | Serebrennikov | |

(Continued)

FOREIGN PATENT DOCUMENTS

| | | |
|---|---|---|
| CA | 2783576 | 11/2002 |
| JP | 2002197107 | 7/2002 |

*Primary Examiner* — Kambiz Zand
*Assistant Examiner* — Abiy Getachew
(74) *Attorney, Agent, or Firm* — Weiss & Arons LLP; Michael A. Springs, Esq.

(57) ABSTRACT

An apparatus for automatic completion of an entry into an input field is provided. The apparatus may include a webpage. The webpage may include a search box. The search box may include a user input field. The apparatus may further include a processor and a machine-readable memory. When a user begins to type a query into the user input box, the processor may be configured to complete, pending user confirmation, the user's query. The completion may be based, for example, on information stored on the machine-readable memory pertaining to the user. The information may be available to an authorized accessor of the machine-readable memory via a secure communications channel. However, the information may be restricted from the user's access via a communications channel associated with the user.

12 Claims, 8 Drawing Sheets

(56) References Cited

U.S. PATENT DOCUMENTS

| | | | |
|---|---|---|---|
| 2008/0005789 A1* | 1/2008 | Kigo | G06F 21/41 726/5 |
| 2011/0035278 A1 | 2/2011 | Fordyce, III et al. | |
| 2011/0093488 A1* | 4/2011 | Amacker | G06F 17/30873 707/767 |
| 2012/0240214 A1* | 9/2012 | Ogura | G06F 21/31 726/12 |
| 2013/0073306 A1* | 3/2013 | Shlain | G06Q 10/06 705/2 |
| 2013/0262107 A1 | 10/2013 | Bernard | |
| 2014/0279474 A1 | 9/2014 | Evans et al. | |

* cited by examiner

| Current User Login: | Previous User Login history: | Processor Determination Based on previous user login history: |
|---|---|---|
| Date: 10/11/2013 | Dates: 10/11/2012-10/11/2013 | |
| Time: 10:12 AM EST | Time Range: 9:00 AM - 11:00AM EST | |
| Computer: work PC<br>IP address: 190.003.993.338 | Computer: work PC<br>IP address: 190.003.993.338 | |
| User begins query with "What is....." | Requests include:<br>75%: accounts and account balances<br>10%: review a check<br>12%: review recent cash withdrawals<br>3%: miscellaneous | Processor completes query with "my account and my account balances?" |

METHOD AND APPARATUS FOR AUTOMATIC COMPLETION OF AN ENTRY INTO AN INPUT FIELD

FIELD OF TECHNOLOGY

This invention relates to webpage searching. More specifically, this invention relates to auto-complete functions related to initiating search queries.

BACKGROUND OF THE DISCLOSURE

Conventional search functions enable a user to input one or more terms to define a query. Such terms typically provide a basis for determining a selection from a group of target documents.

In more advanced search engines, an auto-complete function may augment the inputted search terms in order to more quickly and easily enable the user to input search queries.

Such an auto-complete function may typically predict the complete the searches based on pre-determined algorithms.

It would be desirable to draw on certain heretofore unavailable stores of information in order to provide the most accurate auto-complete algorithms and, therefore, to enhance the user searching experience.

It would be yet further desirable to more accurately tune the auto-complete algorithms to more quickly arrive at a highly desired selection of query results.

SUMMARY OF THE INVENTION

An apparatus for automatic completion of an entry into an input field is provided. The apparatus may display a webpage. The webpage may include a search box. The search box may include a user input field. The apparatus may further include a processor and machine-readable memory. When a user begins to type a query into the user input box, the processor may be configured to complete, pending user confirmation, the user's query. The completion of the user's query may be based on, for example, information stored on the machine-readable memory pertaining to the user. In certain embodiments, the information may be available to an authorized accessor of the machine-readable memory via a secure communications channel. Nevertheless, the information may be restricted from the user's readability via a communications channel associated with the user.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Apparatus and methods for automatic completion of an entry into an input field are provided. Such apparatus and methods may include computer hardware and software that are compatible with the internet and the worldwide web.

The apparatus may include a webpage. The webpage may include a search box. The search box may include a user input field. The apparatus may also include a processor. The apparatus may also include a machine-readable memory.

A user may begin to type a query into the user input field. The processor may be configured to complete, pending user confirmation, the user's query. The completion of the user's query may be based on information. The information may be stored on the machine-readable memory. The machine-readable memory may pertain to the user. The information may be available to an authorized accessor of the machine-readable memory via a secure communications channel. The information may not be accessible to the user via a communications channel associated with the user.

The machine-readable memory may be located at a different location than the user. The machine readable memory may also be located at the same location as the user. The information may be stored on a cookie on the machine-readable memory.

The information may include prior user searches. The information may also include personal user information.

In some embodiments, there may be a second processor. The second processor may be located remotely from the user. The second processor may have access to a database. The database may include privileged information about the user.

In these embodiments, the user may attempt to log into a website. The user may be required to enter credentials in order to access the website. The credentials may include a username, password, or any other suitable information. The credentials may include confidential information. In certain instances, the confidential information may not even be accessible by the user. In certain instances, the confidential information may not be viewable by the user.

When a user enters his or her credentials (which may or may not include confidential information), he may be allowed access to, or be directed to, his or her authenticated space within the website. The user may be accessing his or her authenticated website space by entering his or credentials. In response thereto, the second processor may be able to identify the user. When the second processor identifies the user, the second processor may be able to access information, in response to the user entry of confidential information, pertaining to the user.

This information may include prior user searches. The prior user searches may have occurred on any computing device into which the user entered his credentials. The computing machines may include, but are not limited to, a personal computer, a work computer, a handheld device, a smartphone, etc.

On a webpage located on the website, the user may initiate a query. Initiation of a query may include entering one or more keywords into an input field on a search box. The second processor may predict, based on a suitable algorithm and based on the information the second processor may access, what the user's query may be. The prediction may, for example, be based on information located at a different location from the user—i.e., information that is stored remotely from the user. The prediction may be based on information that is local to the user. In certain embodiments, the information may include information input during prior user searches. In some embodiments, the information may include personal and/or confidential user information.

After the prediction, the second processor may present the user with a tentative completion of the user's query. With the user's confirmation—e.g., preferably received by the user accepting the predicted query—the processor may complete and perform the user's query.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

Figure 1:
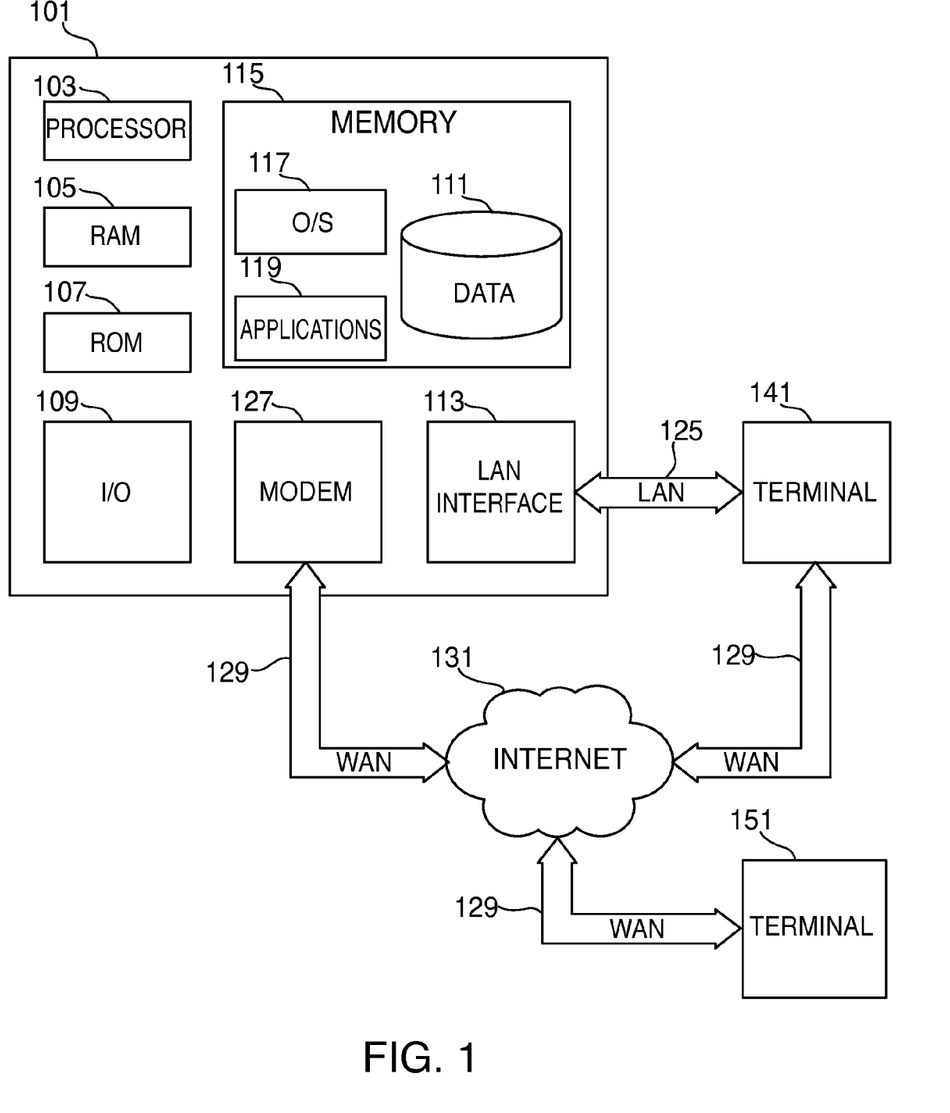
FIG. 1 shows an illustrative apparatus in accordance with principles of the invention.

FIG. 1 is an illustrative block diagram of system 100 based on a computer 101. The computer 101 may have a processor 103 for controlling the operation of the device and its associated components, and may include RAM 105, ROM 107, input/output module 109, and a memory 115. The processor 103 will also execute all software running on the computer—e.g., the operating system. Other components commonly used for computers such as EEPROM or Flash memory or any other suitable components may also be part of the computer 101.

The memory 115 may be comprised of any suitable permanent storage technology—e.g., a hard drive. The memory 115 stores software including the operating system 117 any application(s) 119 along with any data 111 needed for the operation of the system 100. Alternatively, some or all of computer executable instructions may be embodied in hardware or firmware (not shown). The computer 101 executes the instructions embodied by the software to perform various functions.

Input/output ("I/O") module may include connectivity to a microphone, keyboard, touch screen, and/or stylus through which a user of computer 101 may provide input, and may also include one or more speakers for providing audio output and a video display device for providing textual, audiovisual and/or graphical output.

System 100 may be connected to other systems via a LAN interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program(s) 119, which may be used by computer 101, may include computer executable instructions for invoking user functionality related to communication, such as email, Short Message Service (SMS), and voice input and speech recognition applications.

Computer 101 and/or terminals 141 or 151 may also be devices including various other components, such as a battery, speaker, and antennas (not shown).

Terminal 151 and/or terminal 141 may be portable devices such as a laptop, cell phone, Blackberry™, or any other suitable device for storing, transmitting and/or transporting relevant information. Terminals 151 and/or terminal 141 may be other devices. These devices may be identical to system 100 or different. The differences may be related to hardware components and/or software components.

Figure 2:
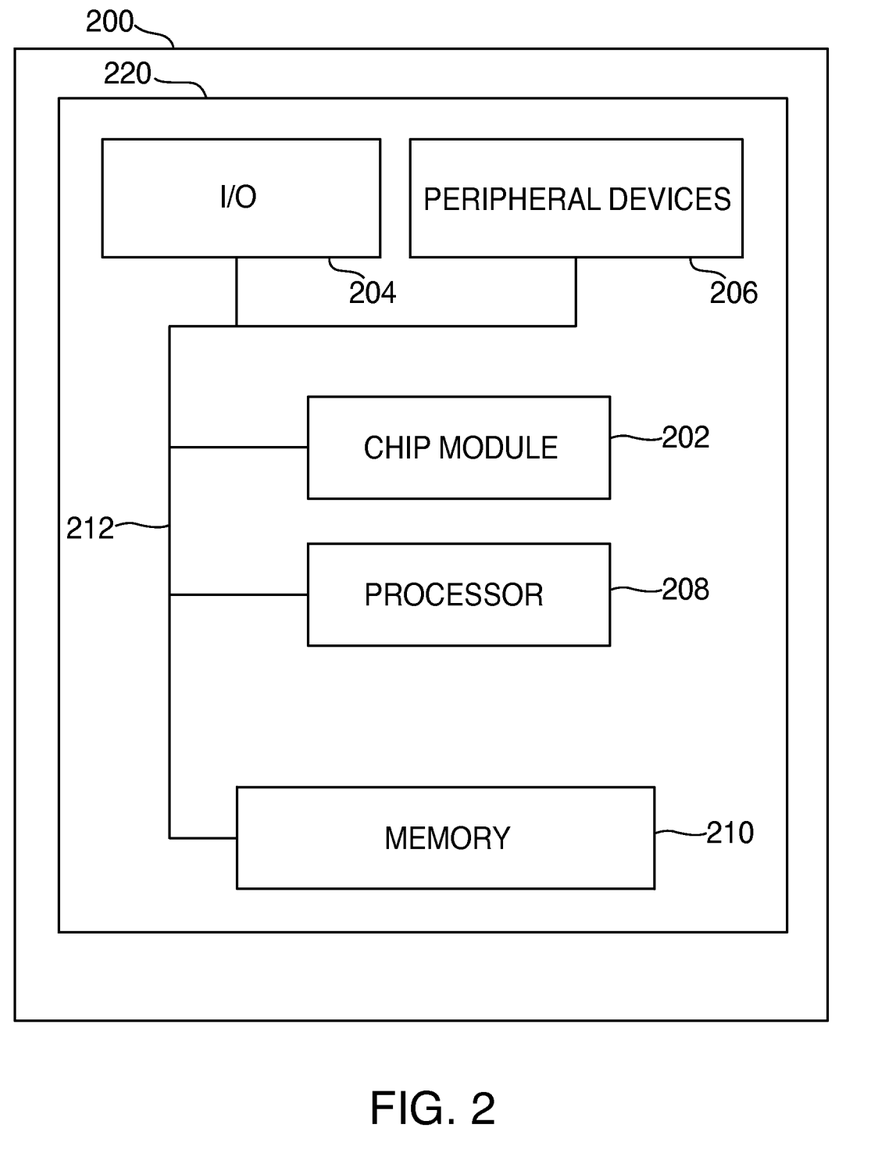
FIG. 2 shows an illustrative apparatus in accordance with the principles of the invention.

FIG. 2 shows illustrative apparatus 200. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may compute data structural information, structural parameters of the data, predict possible queries and machine-readable memory 210.

Machine-readable memory 210 may be configured to store in machine-readable data structures: information pertaining to a user, information pertaining to an account holder and the accounts which he may hold, the current time, information pertaining to historical user searches and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
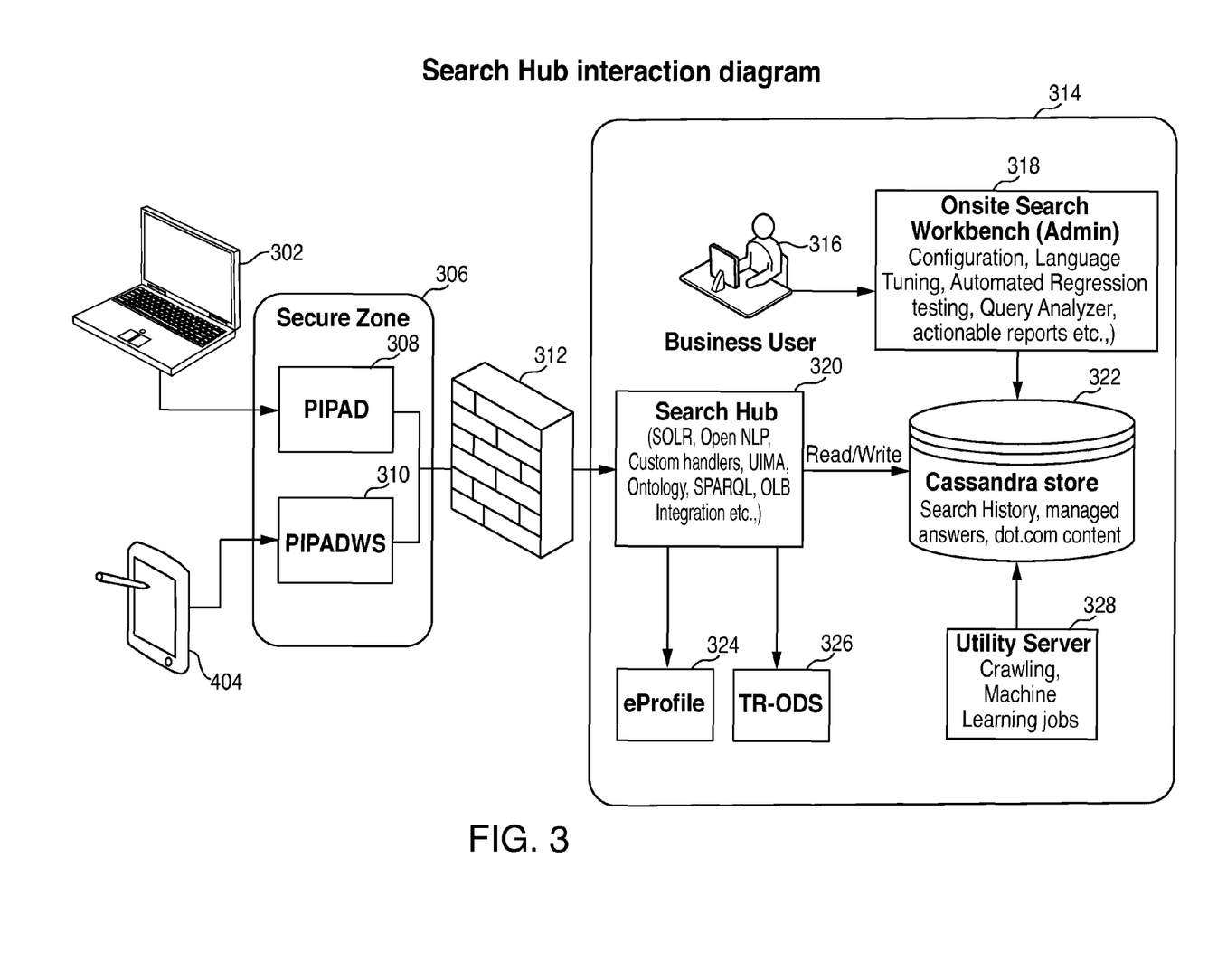
FIG. 3 shows an illustrative hybrid apparatus/flow diagram according to certain embodiments.

FIG. 3 shows an illustrative hybrid apparatus/flow diagram according to certain embodiments. At laptop computer 302 and/or tablet computer 304, FIG. 3 shows a user initiating a query. Initiation of a query may include a letter, a word, a phrase or other information that indicates that the user has expressed interest in obtaining information in response to a preferably user-defined query.

Preferably, the query must first pass through a secure zone 306 prior to traversing firewall 312. Secure zone preferably includes PIPAD 308 for providing a path for query initiation generated by laptop computer 302, and PIPADWS 310 for providing a path for query initiation generated by tablet computer 304.

Upon successful traverse of secure zone 306 and firewall 312, the initiation of the query may enter a search engine application 314.

The search engine application 314 may, in certain embodiments, receive the user's search initiation at search hub 320. Search hub 320 may include a number of open source searching applications.

The following is a short introduction to quality testing for typical searching algorithms. This is presented in order to better understand some of the search quality and efficiency advantages presented by the invention. For analyzing the "quality" of a search retrieval system, it is possible to study whether the results returned by a certain query are related to the query or not. This can be done by determining, given a query and a set of returned documents, the ones that are related—i.e., are relevant—and the ones that are not, and then comparing the number of relevant results returned by the retrieval system.

To formalize this notion of quality, several measures of quality have been defined. With respect to determining search precision—or precision of a predicted search that is presented using an auto-complete—the following metric may be used:

Let R be the set of documents that are relevant, given a query q in a reference collection I.

Also, let A be the set of documents retrieved by a predicted query q, when submitting the query q.

Also, let Ra be the set of documents retrieved by predicted query q that were relevant (i.e., were in the set R).

Accordingly, it can be defined:

That Recall: Ratio between the relevant documents retrieved by the predicted search, and the set of relevant documents from the set R.

Recall=|Ra|/|R|

Precision of Recall: Ratio between the relevant retrieved documents retrieved by the predicted search and the set of retrieved documents.

Precision=Ra/|A|

According to such measures, it can further be understood that the tuning the query using user credentials, which may enable access to user confidential information, may preferably obtain better, and more precise, search results.

First, it is important to understand the basic principles of document retrieval. Typically, document retrieval includes indexing, searching and ranking.

Indexing may involve the representation and organization of the material. Such organization may preferably enable rapid access to the information.

Searching may involve extracting information from the index that satisfies the user information need.

Although ranking may be considered an optional task, it is also important for the retrieval task. Ranking involves sorting the results, based on heuristics. The heuristics preferably determine which results satisfy better the user need.

It should be noted that the algorithms according to the invention presented herein may preferably be used to improve searching. By more accurately presenting auto-complete solutions, the user may be presented with a smaller number of more accurate auto-complete solutions. More accurate auto-complete solutions improve searching because the solutions may be based on information with a higher degree of relevancy. The information retrieved in response to user credentials may be more relevant at least because it is more closely tailored to stored user information.

Such open source search applications, and other applications, included in search hub 320 for use with auto-complete functions, and general searching according to the invention, may preferably include applications such as SOLR, Open NLP, UIMA, SPARQL, among others.

SOLR is an open source search application that provides, inter alia, distributed indexing, replication and load-balanced querying, automated failover and recovery as well as centralized configuration.

The most common OpenNLP tasks include tokenization, sentence segmentation, part-of-speech tagging, named entity extraction, chunking, parsing, and coreference resolution. These tasks are usually required to build more advanced text processing services. OpenNLP also includes maximum entropy and perception-based machine learning.

UIMA is the acronym for Unstructured Information Management Applications. These applications are software systems that analyze large volumes of unstructured information in order to discover knowledge that is relevant to an end user. An examplary UIM application may receive plain text and identify entities, such as persons, places, organizations in response to the received plain text; or relations, such as works-for or located-at.

UIMA enables applications to be decomposed into components, for example "language identification"=>"language specific segmentation"=>"sentence boundary detection"=>"entity detection (person/place names etc.)". Each component implements interfaces defined by the framework and provides self-describing metadata via XML descriptor files. The framework manages these components and the data flow between them. Components are typically written in Java™ or C++; the data that flows between components is designed for efficient mapping between these languages.

UIMA additionally provides capabilities to wrap components as network services, and can scale to very large volumes by replicating processing pipelines over a cluster of networked nodes.

SPARQL, in one aspect, is a query language. SPARQL is "data-oriented" in that it only queries the information held in models. There is preferably no inference in the query language itself. SPARQL preferably takes the description of what the application wants, in the form of a query, and returns that information. In the particular embodiments described herein, SPARQL may serve to retrieve information in response to a completed and/or potential query.

Other aspects of search hub 320 may include customer ontology, which relates to usage of words as retrieved from historical user queries, among others, custom handlers and Online Banking ("OLB") integration.

Some embodiments enable search hub 320 to access eProfile 324. eProfile 324 may include information relating to the user's accounts, personal information, behavior, prior searches, history and any other stored information that may be relevant to a user. In certain embodiments, such information may be accessible exclusively by search hub 320. In certain embodiments, such information may be accessible by the user. In certain embodiments, such information may be accessible exclusively by business user 316.

Search hub may also be coupled to TR_ODS which is an acronym for transactional operational data store. TR-ODS 326 may be understood to be a type of database that serves as an interim area for a data warehouse in order to store time-sensitive operational data that can be accessed quickly and efficiently. In contrast to a data warehouse, which contains large amounts of static data, an ODS contains small amounts of information that is preferably dynamic and may be updated through the course of business transactions.

In some embodiments, TR-ODS 326 may perform numerous quick and simple queries on small amounts of data, such as acquiring an account balance or finding the status of a customer order, whereas a data warehouse may perform complex queries on large amounts of data. An ODS may contain only current operational data while a data warehouse contains both current and historical data.

In conjunction with utilizing the various search software applications, search hub 320 may read and/or write to Cassandra Store 322. Cassandra 322 is an open source distributed database management system designed to handle large amounts of data across many servers. Cassandra preferably provides high availability with no single point of failure.

Cassandra 322 may include, for example, previous user search history, managed answers and/or broadly-based dot-.com content.

Cassandra 322 may also be coupled to receive input from a business user via an onsite workbench 318 (administered by an entity-local admin.) Such a workbench may preferably enable configuration of the various elements of search engine application 314, language tuning for the elements that relate to ontology, query parsing, auto-complete tuning, automated regression testing, query analysis, actionable reports, etc.

Also, Cassandra 322 is preferably coupled to utility server 328. Utility server 328 preferably supports Cassandra 322 by providing web-crawling for certain queries, and adding machine learning where necessary for certain queries.

Figure 4:
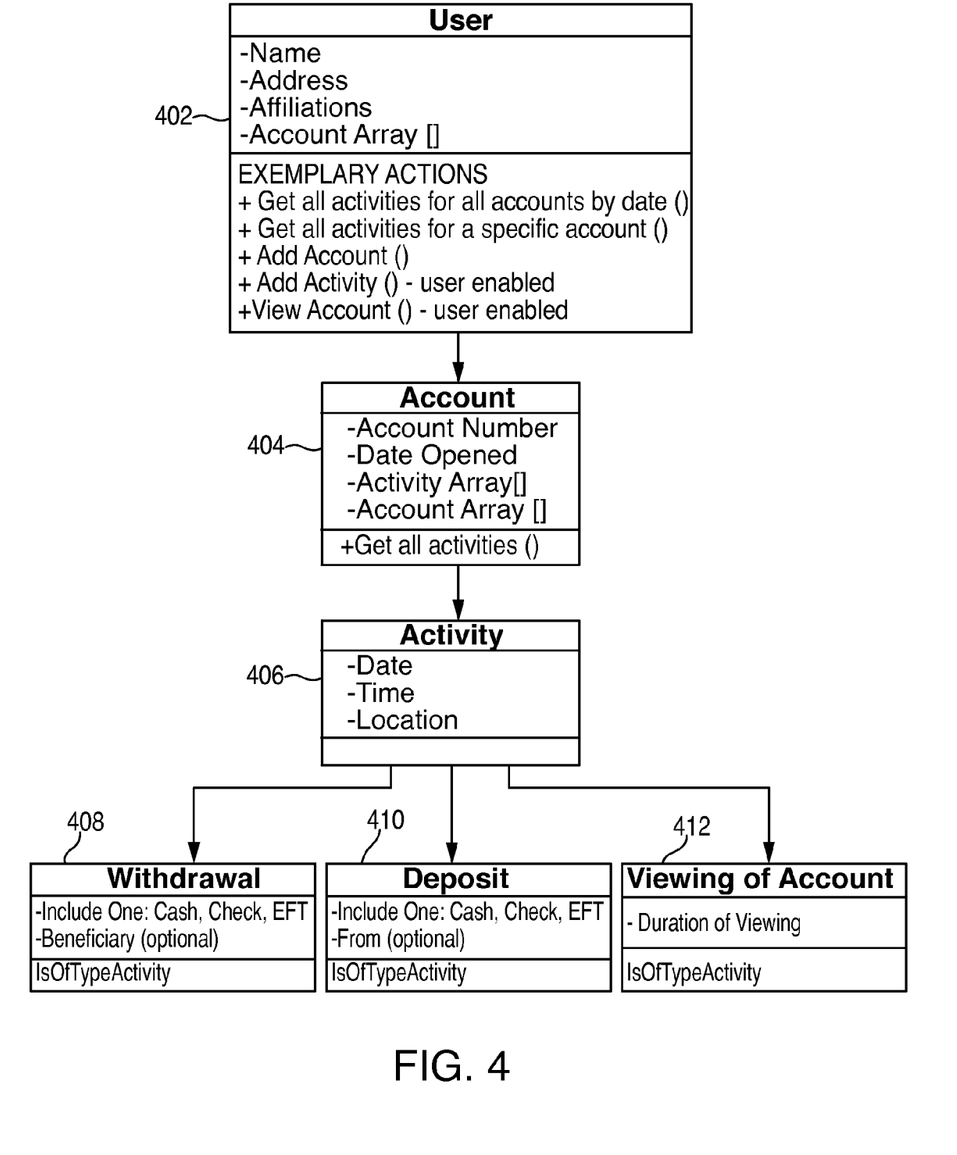
FIG. 4 shows a unified modeling language ("UML") visualization of embodiments according to the invention.

FIG. 4 shows a unified modeling language ("UML") visualization of embodiments according to the invention. At 402, the user's identification information is depicted. For example, the user's name is shown, along with the user's address, affiliations and account array (including a searchable list of the user's accounts).

Exemplary actions are also shown at 402. The exemplary actions may include queries directed to "get all activities for all accounts by date", "get all activities for a specific account", add an account, add an activity (which may be user enabled) and view a user account.

At 404, specific account information is shown. Such specific account information may be retrieved in response to a user's query identified at step 402. Such information may include account number, date opened, activity array and/or additional accounts array. One exemplary action that is shown at 404 is to "get all activities."

In response to a get activity query, step 406 may preferably identify a date, time and/or location of such an activity. Such an activity may be further characterized as a withdrawal as shown at 408, a deposit at 410 and/or a viewing of account 412.

The withdrawal at 408 may preferably include a determination as to whether the activity includes a cash withdrawal, a check withdrawal or an electronic funds transfer ("EFT"). The beneficiary of the withdrawal may also be included (optional).

The deposit at 410 may preferably include a determination as to whether the activity includes a cash deposit, a check deposit and/or an EFT deposit.

The viewing of account at 412 may include a duration of viewing.

Figure 5:
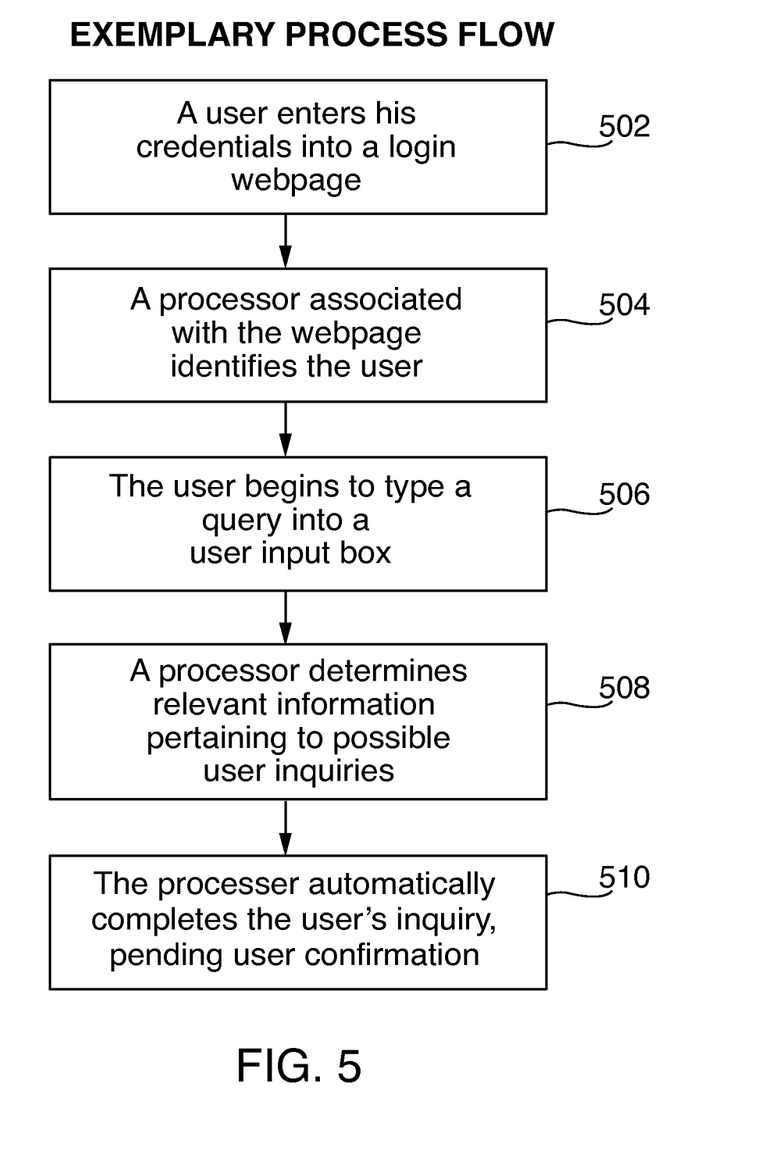
FIG. 5 shows an illustrative flow diagram in accordance with the principles of the invention.

FIG. 5 shows an illustrative flow diagram according to some embodiments. Step 502 shows a user entering his or her credentials into a login webpage.

Step 504 shows that a processor associated with the webpage may identify the user. The user may, at step 506, initiate a query by beginning to type a query into a user input box.

At step 508, a processor may determine relevant information pertaining to possible user inquiries. The relevant information may include information that is only available from a user-inaccessible storage location. The relevant information may include information that is only available from a remote, with respect to the user, storage location. The relevant information may include information that is only available from a storage location that is only accessible in response to the user inputting user credentials.

It should be noted that, while step 508 may, in one embodiment, be understood to include determining (and retrieving) relevant information that is only available from a storage location that is only accessible in response to the user inputting user credentials, nevertheless the scope of the embodiments are not necessarily limited to only such embodiments. Rather, embodiments may also include determining (and retrieving) information from sources other than sources that contain information that is only available from a storage location that is only accessible in response to the user inputting user credentials. For example, embodiments may also include determining (and retrieving) information from sources that include statistics of all users' previous queries along with the contexts of such queries.

Based on the retrieval shown in step 508, and relevant predictive algorithm, step 510 shows that the processor may auto-complete the user's inquiry. The inquiry may require user confirmation in order to execute and retrieve documents.

Figure 6:
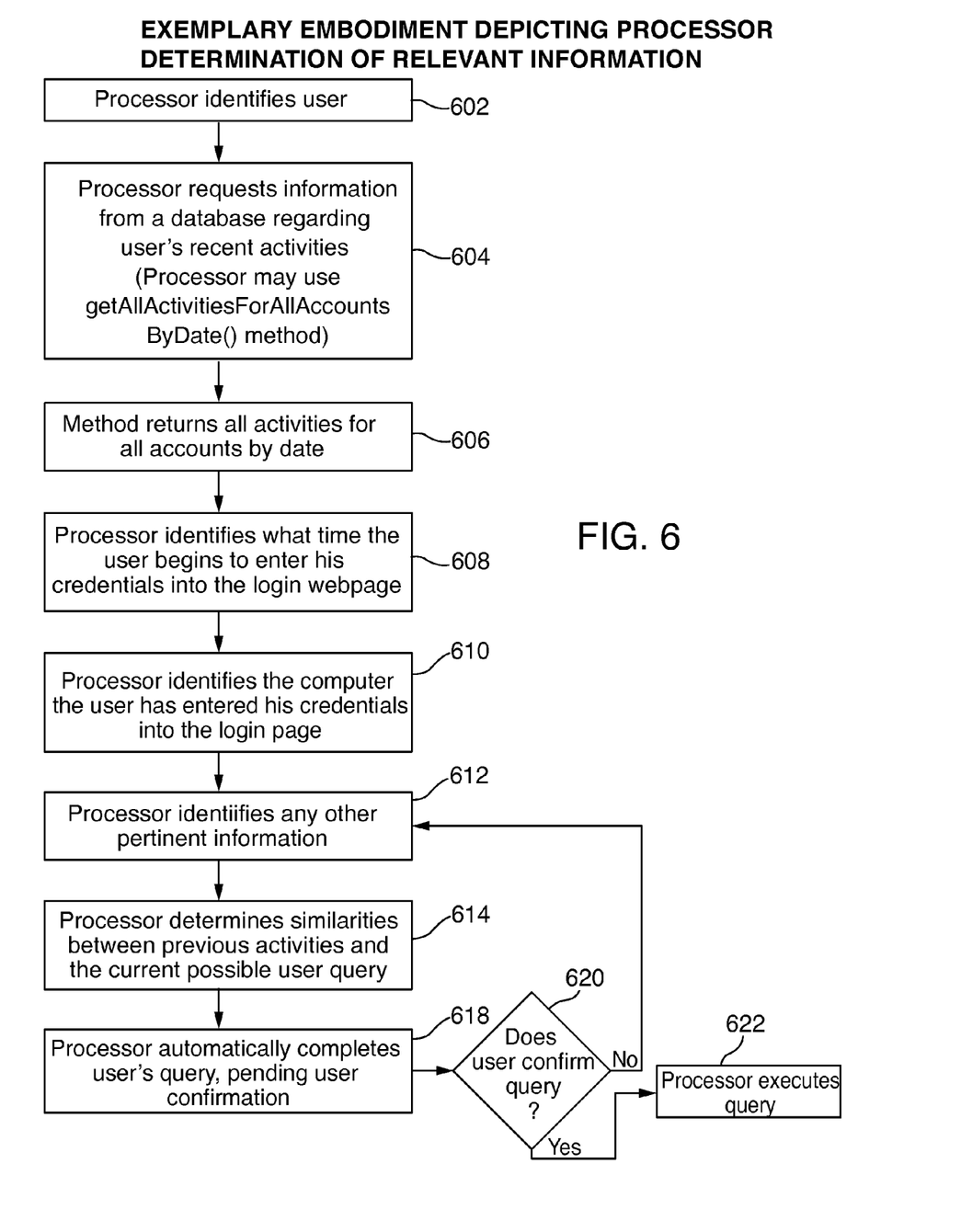
FIG. 6 shows another illustrative flow diagram in accordance with the principles of the invention.

FIG. 6 shows another illustrative flow diagram depicting certain methods according to the invention. Step 602 shows a processor identifying user. Such identification may preferably be obtained in response to a user entering credentials.

Step 604 shows a processor requesting information from a database regarding the user's recent activities. In one exemplary embodiment of such an algorithmic step, the processor may utilize a getAllActivitiesForAllAccountsByDate( ) method for obtaining information related to the user's recent activities.

Such a method may preferably return all activities for all accounts by a specified date, as shown in step 606. In yet another exemplary algorithmic step, the processor may identify what time the user began to enter his credentials, as shown in step 608.

In yet another exemplary algorithmic step, the processor may identify at what computer the user entered his credentials, as shown in step 610. In yet another exemplary algorithmic step, the processor may retrieve any other pertinent information, as shown in step 612.

Following retrieval of some or all of the foregoing information, the processor may return a determination of similarities between activities retrieved by getAllActivitiesForAllAccountsByDate( ), as shown in step 614.

The processor may then auto-complete a user query based on the similarities reaching a pre-determined threshold of likeness between the historical information and the initiated query or on any other relevant information as shown in step 618.

At 618, the processor may also display, in response to a determination of sufficient likeness, the prediction as a user-viewable auto-complete option. Step 620 shows the decision step of whether the user confirms the query. If the user confirms the auto-complete, then the processor may execute the predicted query as shown at step 622. If the user does not confirm the auto-complete, then the processor may identify any other pertinent information, as shown in step 612. The processor may then return documents related to the query.

Figure 7:
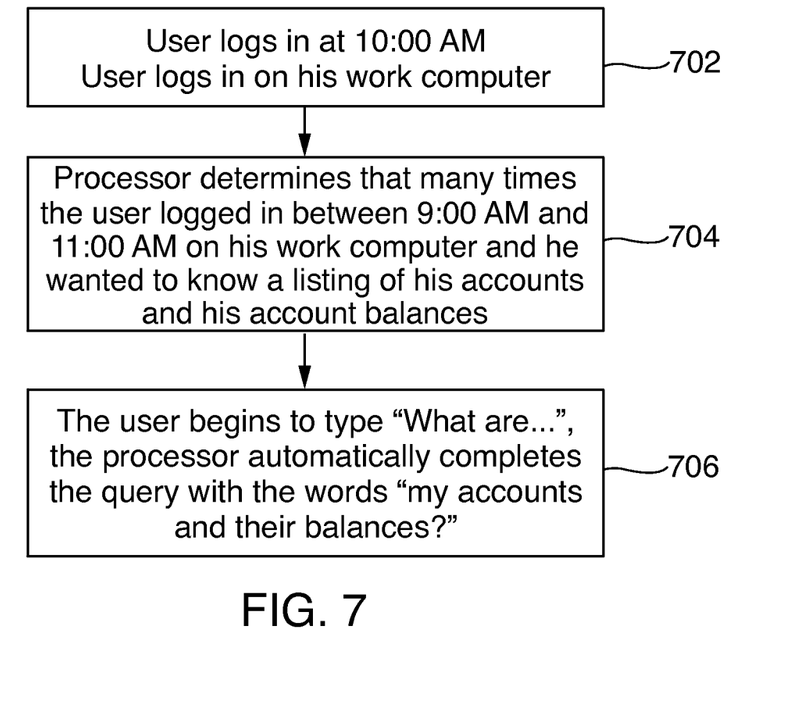
FIG. 7 shows yet another illustrative flow diagram accordance with the principles of the invention.

FIG. 7 shows yet another example of an illustrative flow diagram according to the invention. Specifically, the flow diagram illustrates an exemplary algorithm according to certain embodiments.

Step 702 shows a user logging in at 10:00 AM. Step 702 also shows that the user is logging in to his work computer.

Step 704 shows that, based on step 702, the processor determines that many times the user logged in between 9:00 AM and 11:00 AM on his work computer. When he logged in during this time window from his work computer, he often indicated an interest in reviewing a listing of his accounts and/or his account balances.

Step 706 shows that the user initiates the query by typing "what are . . . " At this point, step 706 shows that the processor auto-completes the query with the words, "my accounts and their balances?"

Figure 8:
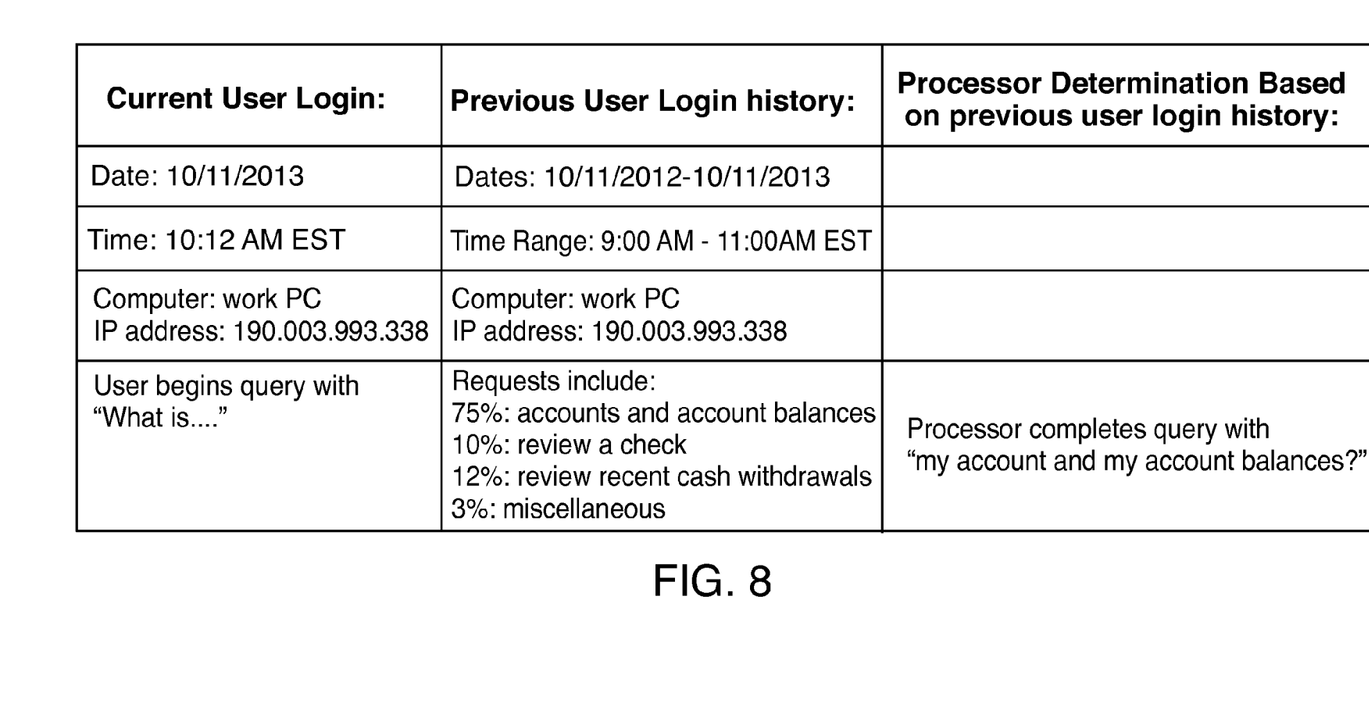
FIG. 8 shows an illustrative chart showing additional detail for understanding the information set forth in FIG. 7.

FIG. 8 shows an illustrative chart showing additional detail for understanding the information set forth in FIG. 7. "Current user login" column preferably sets forth the date, time, IP address and initial query of the user's login.

"Previous user login" sets forth a statistical rendering of the user's login history over the dates 10/11/2012 to 10/11/2013.

"Processor Determination Based on previous user login history:" sets forth an auto-complete option based on a prediction. The prediction preferably takes into account the information included in "Current user login" and "Previous user login."

Thus, methods and apparatus for improving auto-complete predictions for use with online navigational searching are provided. Persons skilled in the art will appreciate that the present invention can be practiced by other than the described embodiments, which are presented for purposes of illustration rather than of limitation, and that the present invention is limited only by the claims that follow.

What is claimed is:

1. An apparatus for automatic completion of an entry into an input field, the apparatus comprising:
   a webpage, the webpage comprising:
      a search box, the search box comprising:
         a user input field;
   a remote processor;
   a local machine-readable memory;
   wherein, when a local user of the machine-readable memory, said user being located at the same location as the machine-readable memory, begins to type a query into the user input box, the remote processor is configured to complete, pending user confirmation, the user's query based on:
      historic user login information stored on the machine-readable memory pertaining to the user, wherein the historic user login information is available to a remote authorized accessor, associated with the remote processor, of the local machine-readable memory via a secure communications channel, but the historic user login information included in a portion of the machine-readable memory that is specific to the user is restricted from the local user's access via a communications channel associated with the user, said historic user login information comprising:
         dates of a plurality of previous user logins;
         time ranges of the plurality of previous user logins;
         an IP address associated with each of the plurality of previous user logins;
         computer identification information associated with the plurality of previous user logins; and
         content metrics of a plurality of previous user requests associated with the plurality of previous user logins;
      wherein the remote processor compares the historic user login information with retrieved information associated with the user's query, all of said retrieved information relating to the user, and being restricted from the user's access, said historic user login information being used to complete the user's query.

2. The apparatus of claim 1, wherein the historic user login information comprises prior user searches.

3. The apparatus of claim 1, wherein the historic user login information comprises personal user information.

4. The apparatus of claim 1, wherein the historic user login information is stored on a cookie on the local machine readable memory.

5. An apparatus for automatic completion of an entry into an input field, the apparatus comprising:
   a webpage, the webpage comprising:
      a search box, the search box comprising:
         a user input field;
   a remote processor;
   a local machine-readable memory;
   wherein, when a local user of the machine-readable memory, said user being located at the same location as the machine-readable memory, begins to type a query into the user input box, the processor is configured to complete, pending user confirmation, the user's query based on:
      historic user login information stored on the machine-readable memory pertaining to the user, wherein the historic user login is available to a remote authorized accessor of the local machine-readable memory via a secure communications channel, but historic user login the information included in a portion of the machine-readable memory that is specific to the user is restricted from the user's readability via a communications channel associated with the user, said historic user login information comprising:
         dates of a plurality of previous user logins;
         time ranges of the plurality of previous user logins;
         an IP address associated with each of the plurality of previous user logins;
         computer identification information associated with the plurality of previous user logins; and
         content metrics of a plurality of previous user requests associated with the plurality of previous user logins;
      wherein the remote processor compares the historic user login information with retrieved information associated with the user's query, all of said retrieved information relating to the user and being restricted from the user's access, said historic user login information being used to complete the user's query.

6. The apparatus of claim 5, wherein the historic user login information comprises prior user searches.

7. The apparatus of claim 5, wherein the historic user login information comprises personal user information.

8. The apparatus of claim 5, wherein the historic user login information is stored on a cookie on the local machine readable memory.

9. One or more non-transitory computer-readable media storing computer-executable instructions which, when executed by a processor on a computer system, perform a method for automatic completion of an entry into an input field, the method comprising:
   displaying a user input field in a search box on a webpage;

enabling a local user, said local user being located at the same location as the machine-readable memory, to begin to type a query into the user input box;

completing, pending user confirmation, the user's query based on historic user login information stored on machine-readable memory pertaining to the user, wherein the historic user login information is available to a remote authorized accessor of the local machine-readable memory via a secure communications channel, but the historic user login information included in a portion of the machine-readable memory that is specific to the user is restricted from the local user's access via a communications channel associated with the user, said historic user login information comprising:

dates of a plurality of previous user logins;

time ranges of the plurality of previous user logins;

an IP address associated with each of the plurality of previous user logins;

computer identification information associated with the plurality of previous user logins; and content metrics of a plurality of previous user requests associated with the plurality of previous user logins;

wherein a remote processor associated with the remote authorized accessor compares the historic user login information with retrieved information associated with the user's query, all of said retrieved information relating to the user and being restricted from the user's access, said historic user login information being used to complete the user's query.

10. The method of claim 9, wherein the historic user login information comprises prior user searches.

11. The method of claim 9, wherein the historic user login information comprises personal user information.

12. The method of claim 9, wherein the historic user login information is stored on a cookie on the local machine readable memory.

* * * * *